(12) United States Patent
Fetherston (10) Patent No.: US 7,422,337 B1
(45) Date of Patent: Sep. 9, 2008

(54) REAR-VIEW SAFETY MIRRORS

(76) Inventor: David Eugene Fetherston, 6142 Spring Valley, San Antonio, TX (US) 78247-1688

( * ) Notice: Subject to any disclaimer, the term of this patent is extended or adjusted under 35 U.S.C. 154(b) by 157 days.

(21) Appl. No.: 11/280,383

(22) Filed: Nov. 16, 2005

Related U.S. Application Data (60) Provisional application No. 60/630,431, filed on Nov. 23, 2004.

(51) Int. Cl.
   G02B 5/10 (2006.01)
   G02B 7/182 (2006.01)
   B60R 1/04 (2006.01)

(52) U.S. Cl. .................. 359/855; 359/857; 359/865; 359/868; 359/903; 248/467; 248/479

(58) Field of Classification Search ............ 359/850, 359/854, 855, 857, 858, 862, 864, 865, 879, 359/881, 903, 868, 872; 248/467, 479
See application file for complete search history.

(56) References Cited

U.S. PATENT DOCUMENTS

| | | | | |
|---|---|---|---|---|
| 328,742 | A * | 10/1885 | Wiederer | 359/854 |
| 1,088,764 | A * | 3/1914 | Booth | 359/854 |
| 1,451,236 | A * | 4/1923 | Stanfield | 248/466 |
| 2,197,280 | A * | 4/1940 | Topping | 359/861 |
| 3,252,377 | A * | 5/1966 | Kentes | 359/855 |
| 3,972,596 | A | 8/1976 | Baumgardner | |
| 4,758,078 | A | 7/1988 | Bracamonte | |
| 5,424,875 | A * | 6/1995 | Davis, II | 359/850 |
| 5,777,808 | A * | 7/1998 | Rashad | 359/855 |
| 6,593,960 | B1 | 7/2003 | Sugimoto | |
| 6,715,893 | B2 * | 4/2004 | Martinson | 359/855 |
| 6,871,971 | B2 | 3/2005 | Morrison | |
| 6,926,416 | B2 * | 8/2005 | Sawyer | 359/855 |
| 7,137,716 | B2 * | 11/2006 | Bogard et al. | 359/855 |
| 2003/0107826 | A1 | 6/2003 | Shafrir | |
| 2005/0052762 | A1 | 3/2005 | Ejaz | |

FOREIGN PATENT DOCUMENTS

| | | | |
|---|---|---|---|
| DE | 1808363 | * | 11/1968 |
| EP | 0235993 | * | 9/1987 |
| JP | 01-195153 | * | 8/1989 |
| NL | 6407141 | * | 12/1964 |

OTHER PUBLICATIONS

U.S. Appl. No. 60/630,431, Fetherston.

* cited by examiner

Primary Examiner—Ricky D Shafer (57) ABSTRACT

Two identical sides, include convex mirror 61, mirror-backing 62 and main-frame 21. Sides are attached together and to frame-backing 30 by three hinges 70. Three adjustable length legs 80 with swivel, magnetic feet 90 in main-frames 21 near corners. Front, centerline view provides reflections, right and left, 90 degrees to centerline, through 40 degree arcs backward. Mirrors are centered at rear of vehicle's trunk-lid so as visible through the inside rear-view mirror. Driver can thus easily and safely see critical areas which may otherwise be unobservable. This includes seeing around vehicles parked on either side. In highway driving, these mirrors allow a driver to clearly see "blind-spots" in the rear-view mirror. Risk of losing attention to the road and positive steering by turning around to look, is thus avoided.

1 Claim, 8 Drawing Sheets

REAR-VIEW SAFETY MIRRORS

CROSS-REFERENCE TO RELATED APPLICATIONS

This application claims the benefit of provisional patent application Ser. No. 60/630,431 filed Nov. 23, 2004 by the present inventor.

FEDERALLY SPONSORED RESEARCH

Not Applicable

SEQUENCE LISTING OR PROGRAM

Not Applicable

BACKGROUND OF THE INVENTION

1. Field of Invention

This invention relates to mirrors disposed such that from a single viewing point, visibility is provided at predetermined angles both right and left and through arcs away from the viewer.

2. Prior Art

There appears to be no other prior art which solves the problem of the driver of a vehicle having virtually no visibility of possible on-coming cross-traffic when backing out of a straight-in parking space where vision is blocked on one or both sides by large vehicles. This invention, in combination with the existing inside rear-view mirror, provides the needed visibility for this specific situation as well as for many other situations.

OBJECT AND ADVANTAGES

Accordingly, several objects and advantages of my invention are:

(a) to provide a vehicle driver visibility of rearward side areas frequently not visible from the drivers position using only the standard mirrors and only partially by physically turning around to look;

(b) to make such visibility readily accessible to the driver through the normal process of just looking at the inside rear-view mirror;

(c) to make such visibility available virtually simultaneously in directions both right and left of the driver by being able to see both directions with minimal eye movement;

(d) to make such visibility available without requiring any mirror adjustments for different drivers except for normal adjustment of the inside rear-view mirror for driver height;

(e) to provide, in situations such as parked straight-in with large vehicles on one or both sides or when backing out of a driveway onto a possibly busy street, a positive means of verifying whether or not it is safe to start backing out, including concern for pedestrians;

(f) to make such visibility available even when normal side views are blocked such as by hanging clothes as long as the view to the rear via the inside rear-view mirror is not blocked;

(g) to eliminate the dangerous practice, particularly at high speeds, of not maintaining forward vision and steering control by physically turning around and looking back to be sure that it is safe to change lanes, including after passing another vehicle;

(h) to provide visibility of vehicles coming from the back on either side such as at high-way exits onto service roads and at intersections where there is a right-turn lane with a yield sign; or in other situations such as when backing out of a home driveway onto a possibly busy street;

(i) to provide this much needed visibility especially to drivers with a handicap which limits motion and the ability to turn around for visual checks even when the vehicle is stopped.

Further objects and advantages are to provide a unit which is adaptable and adjustable for use on almost any sedan and can be easily installed and removed for "as needed" use without modifying or affecting the vehicle in any way. A reinforced installation without vehicle modification and a permanent installation requiring minimal vehicle changes are also provided.

Further objects and advantages of my invention will become apparent from consideration of the drawings and ensuing descriptions.

SUMMARY

In accordance with the present invention, in combination with an existing rear-view mirror, mirrors of predetermined size and shape are disposed and positioned so as to provide from a driver's point of view, visibility of predetermined areas which may not otherwise be visible from that viewpoint.

DRAWINGS

Figures

In the drawings, closely related figures have the same number but different alphabetic suffixes.

FIG. 12 shows views available to a driver when the vehicle is parked straight-in.

DRAWINGS

Reference Numbers with [Page/Line-Number] of First Use

| | | | |
|---|---|---|---|
| 20 | Main-frame assembly [6/3] | 21 | Main-frame [6/3] |
| 22 | Alignment hole [7/18] | | |
| 30 | Frame-backing [6/8] | 31 | Angle-set chain [17/12] |
| 40 | Coil tension spring assembly [7/3] | 41 | Coil tension spring [7/20] |
| 42 | Spring hole #1 [7/20] | 43 | Spring-retainer pin #1 [8/2] |
| 44 | Spring hole #2 [9/2] | 45 | Spring-retainer pin #2 [9/12] |
| 46 | Spring-retainer hole [9/11] | | |
| 50 | Angle-adjuster assembly [7/3] | 51 | Angle-adjuster hole [8/10] |
| 52 | Angle-adjuster sleeve [8/10] | 53 | Angle-adjuster screw [8/10] |
| 54 | Angle-spacer hole [7/21] | 55 | Angle-spacer [10/7] |
| 60 | Mirror assembly [6/4] | 61 | Mirror [6/4] |
| 62 | Mirror-backing [6/4] | 63 | Alignment pin [8/21] |
| 70 | Hinge assembly [6/11] | 71 | Hinge plate two-knuckle side [7/9] |
| 72 | Hinge plate three-knuckle side [7/10] | 73 | Hinge-pin [6/10] |
| 80 | Leg assembly [6/13] | 81 | Leg-retraction hole [7/10] |
| 82 | Leg sleeve [8/16] | 83 | Leg #1 basic length [10/9] |
| 84 | Washer #1 [10/9] | 85 | Tie-down bracket [10/10] |
| 86 | Lock-nut [10/10] | 87 | Leg #2 custom length [10/19] |
| 90 | Foot assembly [6/13] | 91 | Connector [10/21] |
| 92 | Washer #2 [10/21] | 93 | Plug [10/22] |
| 94 | Foot-pin [11/1] | 95 | Foot-casting [10/22] |
| 96 | Magnet [11/3] | | |
| 100 | Trunk-lid (not part of invention) [11/11] | 101 | Suction device [15/6] |
| 102 | Tie-down device [15/8] | 103 | Custom sleeve #1 [16/18] |
| 104 | Custom sleeve #2 [16/19] | 105 | Washer-sealer [16/18] |
| 110 | Mirror front-visibility line [14/9] | 111 | Mirror rear-visibility line [14/11] |
| 112 | Outside rear-view mirrors #1 [14/5] | 113 | Driver's visibility limits #1 [14/3] |
| 114 | Outside rear-view mirrors #2 [14/16] | 115 | Driver's visibility limits #2 [14/16] |
| 116 | Limited mirror arc lines [14/12] | 117 | Maximum mirror arc lines [14/18] |

DETAILED DESCRIPTION

Figure 1:
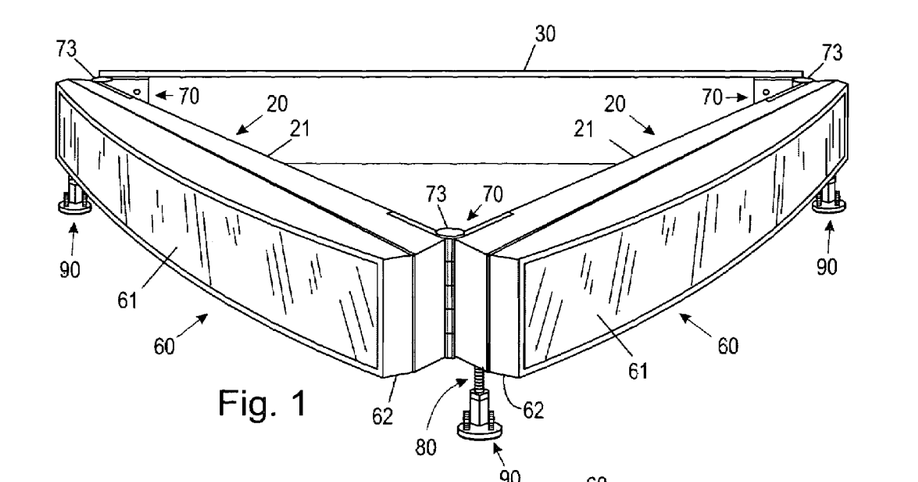
FIG. 1 shows a front view of Rear-View Safety Mirrors.

FIGS. 1, 2, 3, 3A, 3B, 3C, 3D, 3E, 4, 5, 5A, 5B, 5C, 5D, 5E, 6, 7, 7A, 7B, 8, 8A, 8B, 8C, 9, 10, 11 Preferred Embodiment FIG. 1 (front view) shows an overall view of the preferred embodiment of Rear-View Safety Mirrors. A triangular configuration has two mirrored sides which have identical parts and are interchangeable, thus a Main-frame assembly 20 including a Main-frame 21 and a Mirror assembly 60 including a Mirror 61 and a Mirror backing 62 are identical on both sides and descriptions that follow apply to both sides. All references to "inside" or "outside" views or sides of parts are as would be seen from inside or outside the triangle without considering other parts. For reasons which will become evident later, the "front" of the triangle is where the ends of the mirrors are close to each other, a Frame backing 30 is the "back" and the "left" and "right" sides are as viewed from the center of the back, looking towards the front. Center-line is through the center of the front Hinge-pin 73 and equal distances from the back Hinge-pins 73.

Three identical Hinge assemblies 70 are shown, one in each corner of the triangle. Hinges such as 3"×3" door hinges with removable pins will serve the purpose.

Three Leg assemblies 80 and three Foot assemblies 90 are shown, one near each corner.

The Frame backing 30 secures the two Main-frames 21 at a predetermined angle, thus forming a rigid triangle.

The Mirror 61 is of high quality with predetermined size, shape and radius of curvature requiring custom manufacturing. The Mirror backing 62 is shaped and recessed to frame-in and provide common surfaces with the mirror for installation with adhesive. The Main-frame 21, the Mirror backing 62 and the Frame backing 30 may be constructed from any material which is ridged, weather proof, can be drilled or routed and is strong enough to secure screws.

Figure 2:
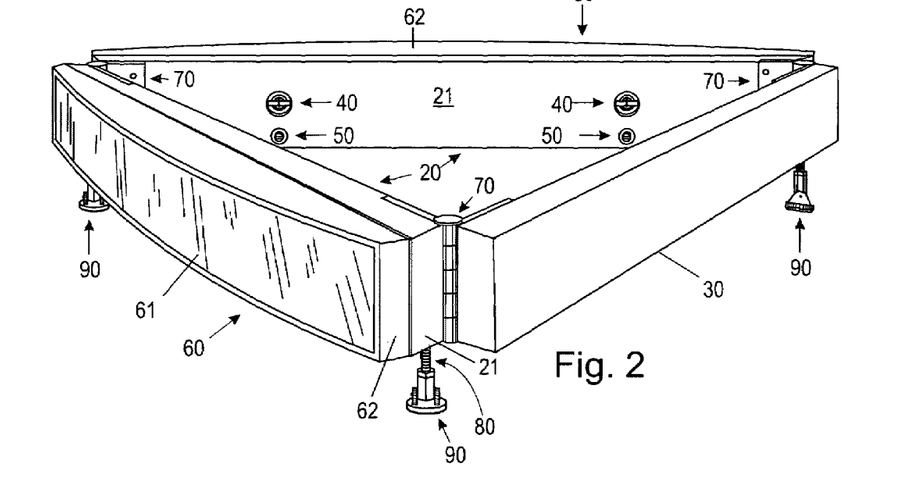
FIG. 2 shows a left-rear view of Rear-View Safety Mirrors.

FIG. 2 (left-rear view) shows another overall view of the preferred embodiment of Rear-View Safety Mirrors. In addition to the parts discussed in FIG. 1, this view shows the inside end of two Coil tension spring assemblies 40 and two Angle adjuster assemblies 50. It also shows more clearly that the Frame backing 30 has a simple rectangular shape with non-recessed attachment of the Hinge assemblies 70.

Figure 3:
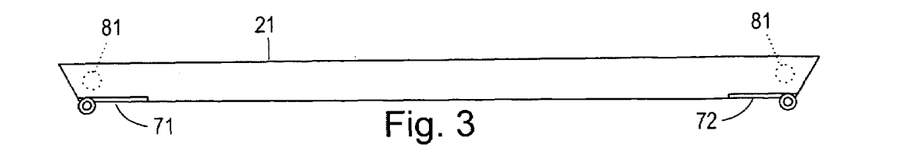
FIG. 3 shows a top view of the main-frame

FIG. 3 shows a top view of the Main-frame 21 with predetermined length and ends with equal angles which are not critical but paralleling the line of the Frame backing 30 is desirable. The outside (longest) length of the Main-frame 21 equals the length of the Mirror backing 62. Also shown are a Hinge plate two-knuckle side 71 on the left and a Hinge plate three-knuckle side 72 on the right, both recessed. The approximate locations of two Leg retraction holes 81 are shown below the surface.

Figure 3A:
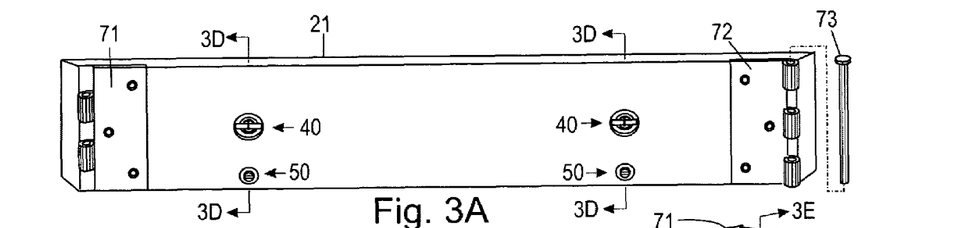
FIG. 3A shows an inside view of the main-frame.

FIG. 3A shows an inside view of the Main-frame 21 with the Hinge plate two-knuckle side 71 on the left, the Hinge plate three-knuckle side 72 on the right and a Hinge-pin 73. Both hinge plates, 71 and 72 are attached with screws (not shown) and adhesive, if desired for added strength, since these plates should never need to be removed. Also shown are ends of two Coil tension spring assemblies 40, two Angle adjuster assemblies 50 and locations of two identical section 3D-3D lines.

Figures 3B, 3C, 3D, 3E:
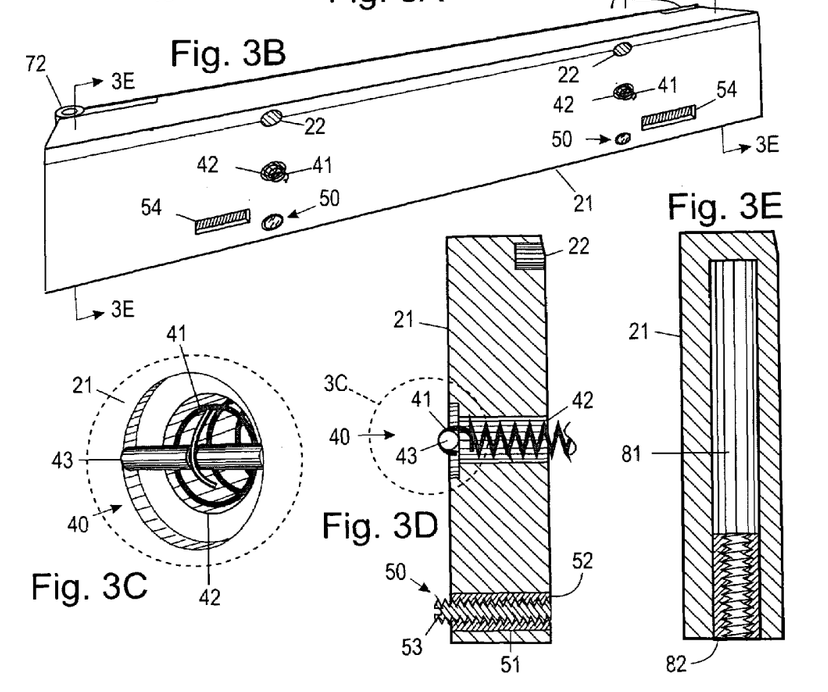
FIG. 3B shows an outside view of the main-frame.
FIG. 3C shows detail of the spring attachment.
FIG. 3D shows a 3D section of the main-frame.
FIG. 3E shows a 3E section of the main-frame.

FIG. 3B shows the outside of the Main-frame 21 including two Alignment holes 22 which can be drilled holes or half-sphere cavities. Also shown are parts of the two Coil tension spring assemblies 40 each including a Spring hole #1 42 and a Coil tension spring 41. Also shown are the outside ends of two Angle adjuster assemblies 50 and two Angle spacer holes 54 either routed or cast to about ⅛" depth, 1½" width and located about ¾" above the bottom of the Main-frame 21 and just outside of the Angle adjuster assemblies 50.

FIG. 3C shows detail of the Coil tension spring 41 and a Spring retainer pin #1 43. The pin #1 43 has rounded, smooth ends and a centered circular groove for the loop of spring 41.

FIG. 3D shows a cross-section which is identical at two 3D-3D lines in FIG. 3A. Shown is the Alignment hole 22 and a bevel of about 10 degrees from the center of the hole 22 towards the top and along the length of the Main-frame 21. The Spring hole #1 42 is shown including a recessed circular area on the same center as the hole #1 42, on the inside of the Main-frame 21, which has a diameter slightly larger than the length of the Spring retainer pin #1 43 and about the same depth as the pin 43 diameter. The Angle adjuster assembly 50 is shown including an Angle adjuster hole 51, an Angle adjuster sleeve 52 and an Angle adjuster screw 53. The hole 51 and the sleeve 52 are sized for a press fit or space to allow permanent installation using an adhesive. Since any force on the sleeve 52 would always be towards the inside, a small, flush flange or flaring on the outside end is desirable. All Angle adjuster screws 53 must be of equal length which, when flush on the outside, extend about ¼" beyond the inside of Main-frame 21.

FIG. 3E shows a section of two identical Leg retraction holes 81 which have a Leg sleeve 82 permanently installed at the bottom, with internal threads matching the Leg assemblies 80.

Figures 4, 5:
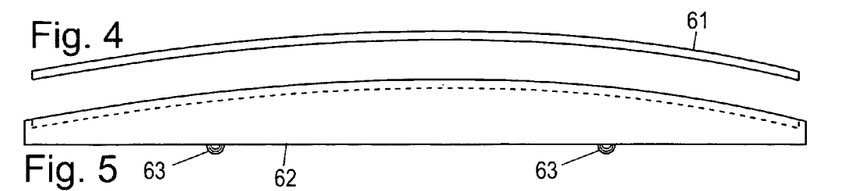
FIG. 4 shows a top view of the convex mirror.
FIG. 5 shows a top view of the mirror-backing.

FIG. 4 shows a top view of the convex Mirror 61 which has a predetermined height, length and radius of curvature. The preferred radius of curvature is about 120 cm (48"), the height about 7.5 cm (3") and the length about 45 cm (18").

FIG. 5 shows a top view of the Mirror backing 62 with a recessed convex curve matching the curve of the mirror. Two Alignment pins 63 are cemented shafts with a half-sphere exposed ends which must be precisely located for accurate mating with two Alignment holes 22. The half-spheres of these pins 63 could be cast as part of the Mirror backing 62 for production.

Figure 5A:
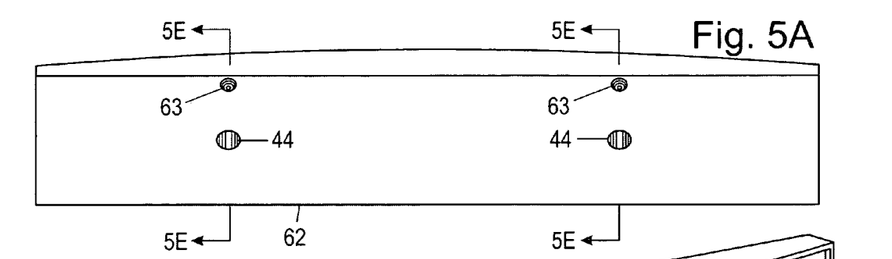
FIG. 5A shows the inside of the mirror-backing.

FIG. 5A shows an inside view of the Mirror backing 62 with two Spring holes #2 44 and the location of two identical section 5E-5E lines. The Spring holes #2 44 must be aligned with Spring holes #1 42 in the Main-frame 21.

Note: In addition to alignment requirements mentioned above for the Alignment pins 63 and holes 22 and for the Spring holes #1 42 and #2 44, these parts and the Angle adjuster holes 51 are all centered, as shown in the figures, on vertical lines which are equal distances from the ends of the Main frame 21 and the Mirror backing 62.

Figures 5B, 5C, 5D, 5E, 6:
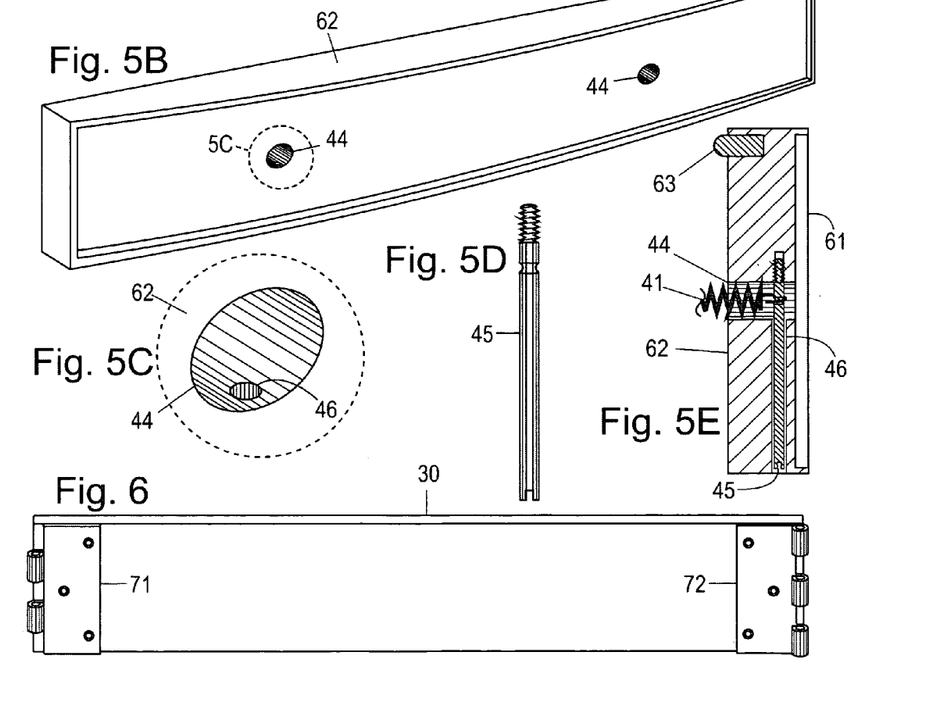
FIG. 5B shows the outside of the mirror-backing.
FIG. 5C shows detail of the spring hole.
FIG. 5D shows detail of a spring retainer
FIG. 5E shows a 5E section of the mirror-backing.
FIG. 6 shows an inside view of the frame-backing.

FIG. 5B shows a perspective of the Mirror backing 62 with detail of the recession for the Mirror 61 and two Spring holes #2 44.

FIG. 5C shows an enlarged view of the Spring hole #2 44 and a Spring retainer hole 46:

FIG. 5D shows enlarged detail of a Spring retainer pin #2 45.

FIG. 5E shows the section 5E-5E lines of two identical Mirror backing 62 locations with the Alignment pin 63, the Coil tension spring 41, the Spring retainer pin #2 45, the Mirror 61, the Spring hole #2 44 and the Spring retainer hole 46 which is smaller above the Spring hole #2 44 an amount to allow self-threading by the Spring retainer pin #2 45.

FIG. 6 shows an inside view of the Frame backing 30 with the Hinge plate two-knuckle side 71 on the left and the Hinge plate three-knuckle side 72 on the right. These hinge plates are not recessed and are attached with screws (not shown). Adhesive cannot be used on these plates since moving them may be desired for changing the angle between the mirrors.

Figure 7:
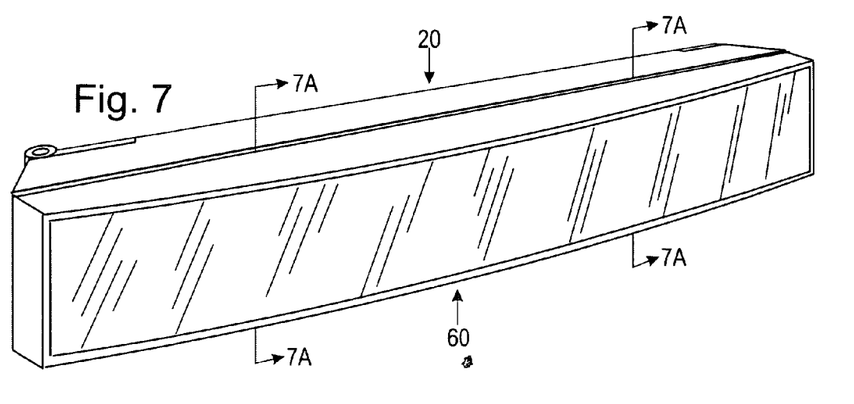
FIG. 7 shows a joined main-frame assembly and mirror assembly.

FIG. 7 shows the assembled Main-frame assembly 20 and the Mirror assembly 60 with the locations of two identical section 7A-7A lines.

Figure 7A:
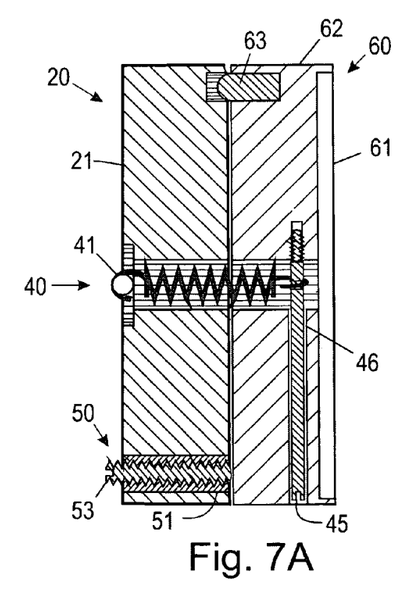
FIG. 7A shows a 7A section of the main-frame assembly and mirror assembly.

FIG. 7A shows sections of the Main-frame assembly 20 and the Mirror assembly 60 with the Mirror backing 62 flush with the Main-frame 21 and the Angle adjuster screw 53 extending about ¼" out of the Main-frame 21.

Figure 7B:
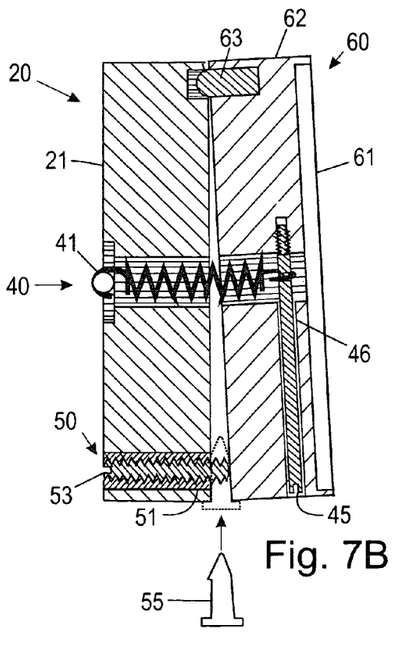
FIG. 7B shows a 7A section with mirror assembly angled out from main-frame assembly.

FIG. 7B shows the same configuration as FIG. 7A but with the Mirror backing 62 angled away from the Main-frame 21. The Coil tension spring 41 has about 5 pounds tension in the flush position and tension should not increase significantly with an added stretch of up to about 2.2 cm (½"). Also shown is an optional Angle spacer 55 and where it fits.

Figures 8, 8A, 8B, 8C, 9, 10:
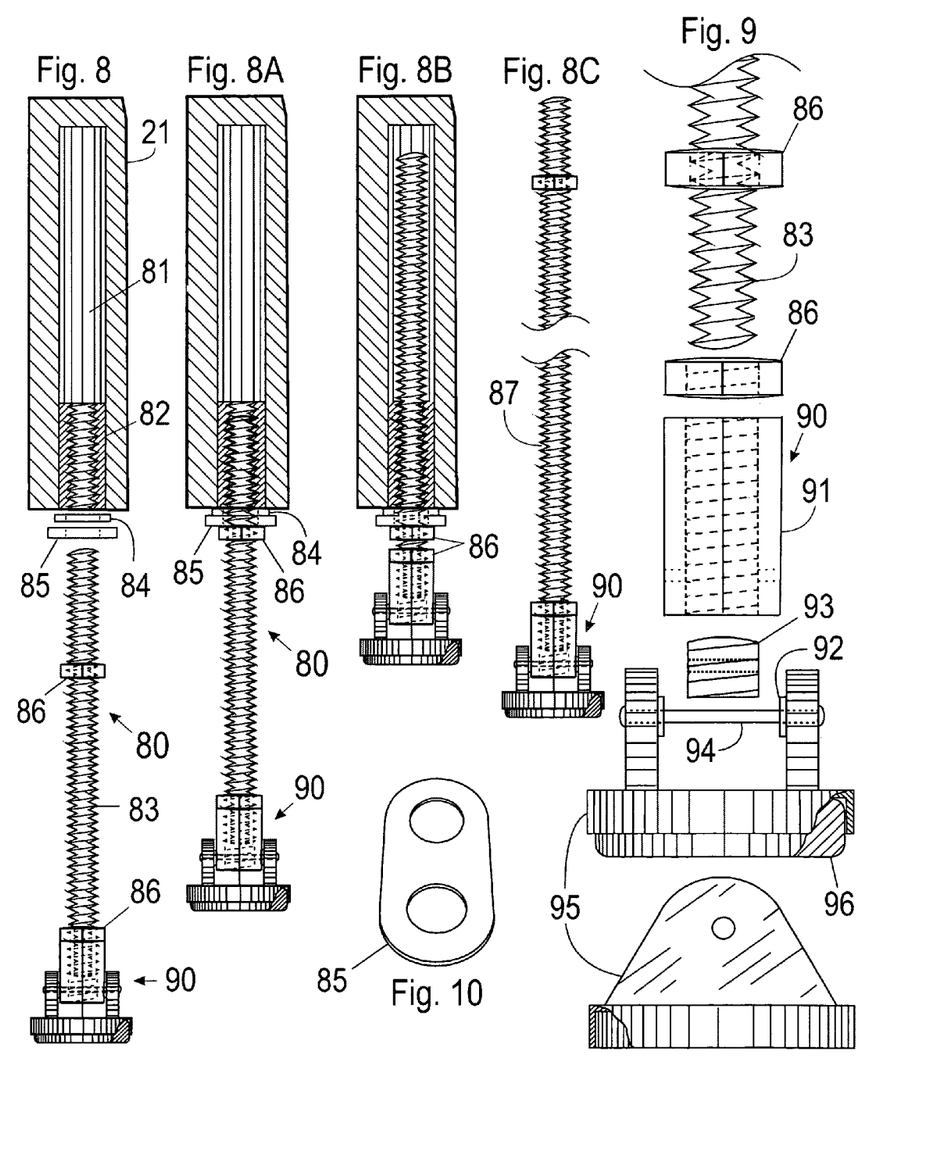
FIG. 8 shows all leg and foot parts.
FIG. 8A shows a leg in the extended position
FIG. 8B shows a leg in the retracted position.
FIG. 8C shows a variable leg length
FIG. 9 shows an enlarged, exploded view of the foot assembly.
FIG. 10 shows an enlarged tie-down bracket

FIG. 8 uses the same section as FIG. 3E to show a partial blow-up of the Leg assembly 80 including the Leg retraction hole 81, the Leg sleeve 82, a Leg #1 83, a Washer #1 84, a Tie-down bracket 85 and two Lock-nuts 86. The Leg sleeve 82 has an internal thread compatible with the Leg #1 83 and is sized either for a press fit into the Leg retraction hole 81 or with enough clearance to allow use of permanent adhesive.

The Washer #1 84 is a common flat washer, the Tie-down bracket 85 (see FIG. 10), or suitable substitute, should be commercially available and all Lock-nuts 86 are hex nuts with compatible threads. Also shown is the Foot assembly 90 which is locked to the Leg #1 83 with the Lock-nut 86.

FIG. 8A shows the same parts as FIG. 8 assembled with the Leg #1 83 in its extended position and locked to the Leg sleeve 82 with the Washer #1 84 and bracket 85 in-between.

FIG. 8B shows the same assembly as FIG. 8A except that the Leg #1 83 is retracted.

FIG. 8C shows that any length of a Leg #2 87 can be made by cutting a threaded rod.

FIG. 9 shows an enlarged blow-up of the Foot assembly 90. The Lock-nut 86 is first on the Leg #1 83 followed by a Connector 91 terminating, with a Washer #2 92 on each side, at a Foot casting 95. A threaded Plug 93 is secured in the end of the Connector 91 and a hole drilled for a Foot pin 94. The Foot casting 95 (two views at the bottom, with and without a magnet) provides wings for securing the Foot pin 94 and a recessed (flanged) under-side which aids in installation of a Magnet 96 with adhesive. The Magnets 96 have a minimum pull of about 25 pounds, are about ¾" diameter and ¼" (or less) thickness. A substitute (not shown) for the Foot casting 95 was handmade from common hardware for prototypes, with washers, bolts, and rivets but the Foot casting 95, or equivalent, would be required for production.

FIG. 10 shows an enlarged perspective of the Tie-down bracket 85. Hardware should be available for this piece but it should be strong enough with the flat surface horizontal to be used as a tie-down with up to about 50# of vertical force at the open hole with no bending.

Figure 11:
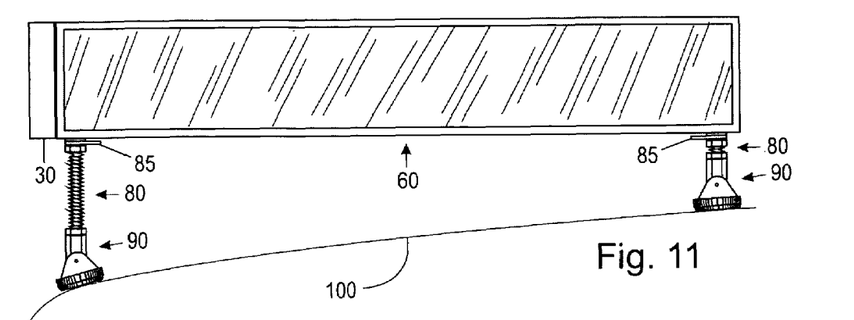
FIG. 11 shows a typical temporary installation.

FIG. 11 shows a profile of the Rear-View Safety Mirrors attached to a typical curved Trunk-lid 100 using the Magnets 96 near each corner of the triangle.

Operation

FIGS. 1, 7A, 7B, 8, 9, 11, 12, 12A, Preferred Embodiment

The completely assembled Rear-View Safety Mirrors shown in FIG. 1 is placed with mirrors facing forward on the trunk-lid of a sedan, as close to the rear of the vehicle as practical. The center-line of the mirrors are aligned with the center-line of the vehicle thus the Frame backing 30 is at 90 degrees to the vehicle's center-line (See FIGS. 11 and 12). The lower Lock-nuts 86 are set to secure the legs firmly to the Foot assemblies 90 (See FIGS. 8 & 9) and the upper Lock-nuts are loose to allow the Legs 83 and Foot assemblies 90 to rotate.

With the vehicle on a level surface, the top surfaces of the Main-frames 21 are adjusted to a desired height (where the driver can see all of both mirrors via the inside rear-view mirror) and leveled in all directions by adjusting the Leg #1 83 lengths. This is best accomplished by lifting one corner at a time and turning the Foot assembly 90. Once height and level requirements are met, the upper Lock-nuts 86 of each leg are tightened against Tie-down bracket 85 with the open bracket 85 hole directed towards the center of the triangle.

The next step is to adjust the vertical angle of each mirror, if necessary, until the driver has a clear, horizontal view of areas on both sides of the vehicle. The inside rear-view mirror, normally being a short distance above the Rear-View Safety Mirrors causes the reflection to be a bit downward and this is corrected by slightly angling the bottom of the mirrors away from the Main-frame 21 by turning the Angle adjuster screws 53 clockwise (See FIGS. 7A & B). The two screws 53 on one Main frame 21 should both be adjusted the same amount in gradual steps until the desired driver's view is obtained. The same procedure should be then followed on the other Main-frame 21. Since there could be concerns about having equal settings on the Angle adjuster screws 53, plastic Angle spacers 55 should be available in sets of four for one degree increments up to about 5 degrees (See FIG. 7B).

Once the leg height and mirror vertical angle adjustments have been made the Rear-View Safety Mirrors are ready to use. The Mirrors may be left in-place or removed and replaced as needed with no further adjustments being required when the unit is positioned in the same place. These same mirrors can also be used on almost any other sedan by making any necessary adjustments as described above.

The advantages of using magnetic attachments, which will not damage the vehicle, are obvious, but since removing the Rear-View Safety Mirrors would be easy, it would be vulnerable to theft and should not be left on a trunk-lid if the vehicle is going to be out of sight. After using the Rear-View Safety Mirrors for awhile, the advantages of having them available all the time becomes very evident. Based on use of the prototypes, the desire to have these Safety Mirrors installed permanently increases and installation and removal become an unwanted nuisance, no matter how easy it is to do. There are ways to permanently install these mirrors which are discussed later.

The two Mirrors 61 are identical but, as would be expected, there are none currently available which meet the preferred, specified requirements discussed above. Since only approximately close mirror designs could be used on the prototypes to demonstrate the feasibility and desirability of Rear-View Safety Mirrors, it will be necessary to do further studies and tests to determine an optimum design for these mirrors. Basic requirements would be established by a producer to meet specific needs but the over-riding criteria has to be presentation of a clear view with size and angular coverage which provides easy driver recognition of vehicles and pedestrians. Concerns about distance recognition due to image distortion (controlled by regulations for other vehicle mirrors) should not be applicable with these mirrors since the distance from you of a vehicle in the next lane is seen by a side-view which quickly reveals the vehicle's position in relation to yours. For example, if the front of a vehicle in the next lane is seen near the front of a Rear-View Safety Mirror it is very close and a lane change would not be attempted. It doesn't matter, therefore, about the image size of the vehicle, just that the vehicle is clearly visible to the driver.

FIG. 7A shows a section of an assembled Main frame assembly 20 and Mirror assembly 60. These two assemblies along with their Leg assemblies 80 and Foot assemblies 90 (see FIGS. 8 & 9) would probably always be presented, fully assembled, as a single unit. Two of these single units would then be attached together and to the Frame-backing 30 by inserting three Hinge-pins 73.

Figure 12:
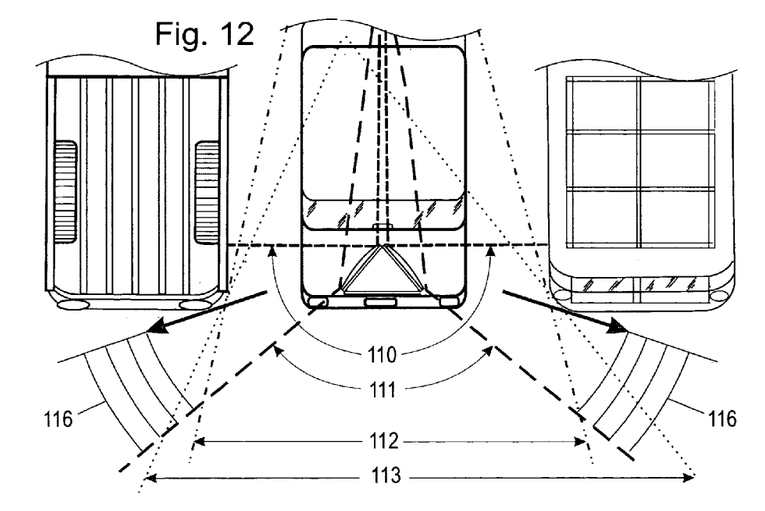

FIG. 12 illustrates a situation where, when parked straight-in, a drivers view of any on-coming cross-traffic is almost completely blocked by vehicle(s) parked on one or both sides. The dotted lines 113 show the maximum visibility if the driver were to physically turn around to look back, however, this is not usually a clear view across the entire area because of door posts, side panels, etc. The dash-dot-dot-dash lines 112 show the outer limits of visibility when looking at the outside rear-view mirrors (not shown). The inside rear-view mirror (not shown), by itself provides no useful visibility at all, and the various "panoramic" solutions offered for both the inside and outside rear-view mirrors provide no solution whatever to the problem of not being able to see around vehicles parked on either side. Heavy short dash lines 110 show the forward visual limits, as seen via the inside rear-view mirror and the preferred embodiment of Rear-View Safety Mirrors. Heavy, long dash lines 111 show the backward visual limits of the safety mirrors with preferred mirror design and sizing. The bold arrows and arc lines 116 show the maximum angles of visibility to both the right and left even before the subject vehicle has backed-out at all, if Rear-View Safety Mirrors are used.

Figure 12A:
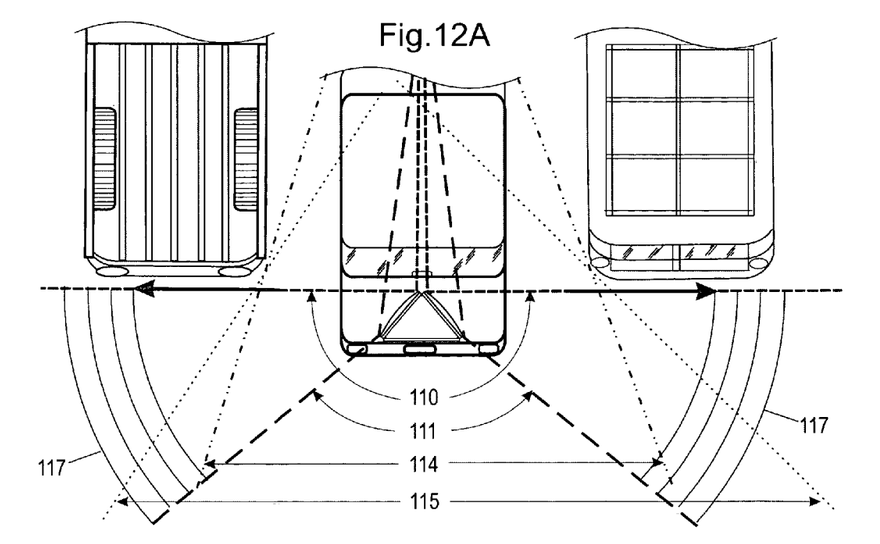
FIG. 12A shows the same views as FIG. 12 with the vehicle backed-out a short distance.

FIG. 12A shows the same information as FIG. 12 but with the subject vehicle having backed out only a short distance. The usual visibilities 114 & 115 have, obviously, improved only slightly. It can be seen, however, that Rear-View Safety Mirrors would provide increasing visibility with any movement backward and complete visibility arcs 117 in both directions before the subject vehicle is out far enough to be threatened by any cross-traffic. Thus Rear-View Safety Mirrors do solve the problem of not being able to see around vehicles by providing the driver with this much needed visibility by merely looking at the inside rear-view mirror.

Looking at FIG. 12A, which shows the maximum arcs of visibility 117 available by using Rear-View Safety Mirrors when there are no obstacles, it is readily apparent that this increased visibility would also be very usefully in many other situations.

Figure 11A:
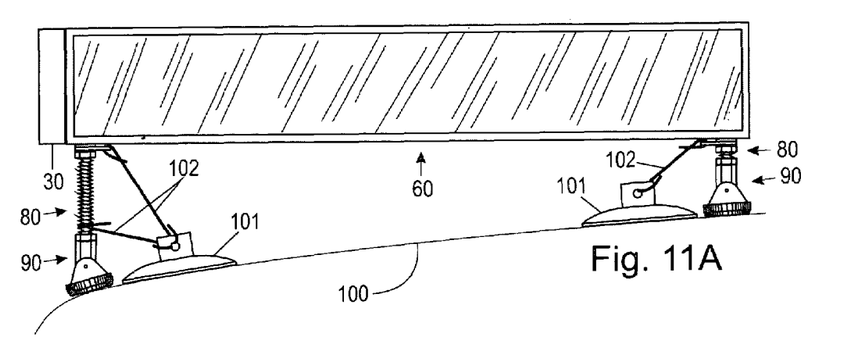
FIG. 11A shows a typical reinforced installation.
Figure 11B:
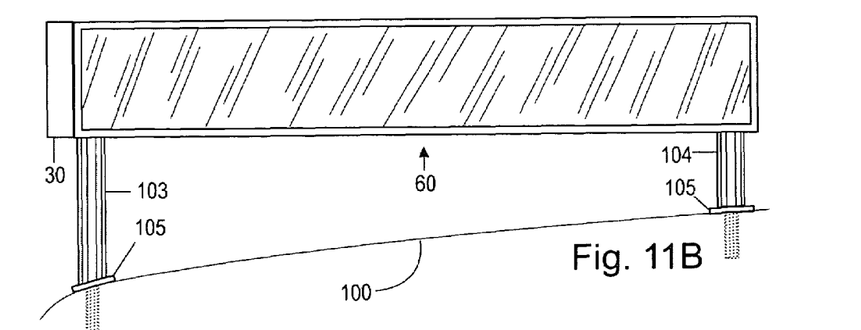
FIG. 11B shows a typical permanent installation.
Figure 13:
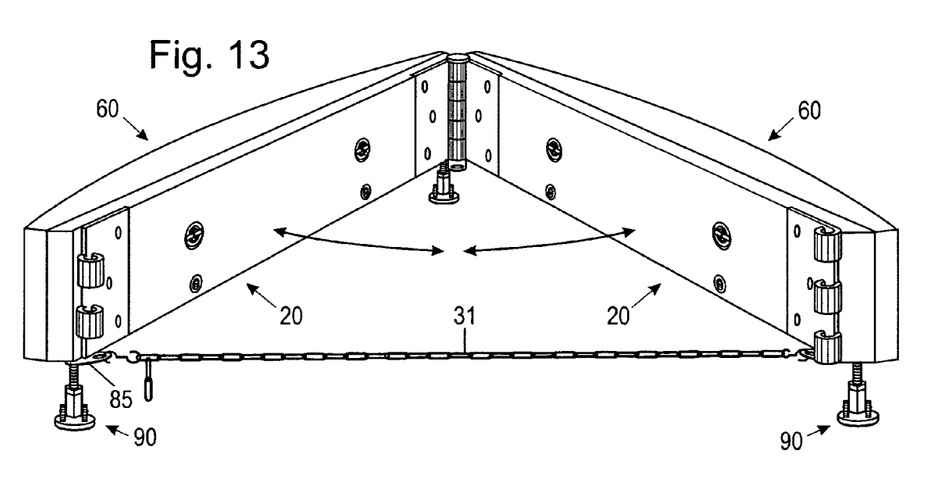
FIG. 13 shows a rear view with the frame-backing removed.

FIGS. 11A, 11B, and 13

Additional Embodiments

Description of Attachment Reinforcement

FIG. 11a Supplement to Preferred Embodiment

FIG. 11A is the same as FIG. 11 except that the magnetic attachment is reinforced with three Suction devices 101 each rated at about 75 pounds pull. The devices 101 are attached to the Trunk-lid 100 inside of each corner and tightly connected to the Tie-down bracket 85 and/or Leg 80 with one or more Tie-down devices 102.

Operation of Attachment Reinforcement

FIG. 11a Supplement to Preferred Embodiment

Although the three specified Magnets 96 are strong enough to ensure secure attachment under normal conditions and certainly for temporary or low speed use, added confidence is easy to obtain with use of three, commercially available Suction devices 101. With each rated at about 75 pounds-pull or above, in combination with three Magnets 96 rated at 25 pounds-pull or above, near each corner of the triangle, it is very unlikely that anything other than a major impact would cause movement or separation.

The Suction devices 101 would each be installed on the Trunk-lid in accordance with the device manufacturer's directions and located close to the Foot assemblies 90 approximately on a line from the assembly 90 to the center of the triangle. This positioning prevents horizontal movement in any direction. If the bottom of the Mirror assembly 60 is close to the Trunk-lid 100, one Tie-down device 102 connection to the Tie-down bracket 85 should be sufficient to prevent either vertical or horizontal movement. If there is some distance between the Mirror assembly 60 and the Trunk-lid 100, to prevent both vertical and horizontal movement it would be best to connect Tie-down devices to both the Tie-down bracket 85 and to the Leg 80 just above the Foot assembly 90, as shown.

This installation provides additional security against any outside forces which might cause movement. Installation and removal of the Rear-View Mirrors are still relatively simple and add only a short time to the procedures, after the Suction devices 101 have been installed once. The devices have an easy way to release the suction so that release is quick and the unit can be lifted as before. The Tie-down devices 102 can be left connected and ready for quick installation again. Since this process still provides for simple and quick removal, concern about theft would still be valid and precautions necessary.

With regards to the security and safety levels of various mounting methods, any producer of these units would very likely run extensive tests to determine if levels of attachment failure do occur and, if so, under what conditions.

Description of Permanent Installation

FIG. 11b Modification of Preferred Embodiment

FIG. 11B shows the same positioning of Rear-View Safety Mirrors as FIG. 11 but with the Foot assemblies 90 removed and long enough Legs #2 87 used so that attachment through holes in the trunk-lid with internal securing (not shown) is possible. The rest of the preferred embodiment remains the same. To maintain the correct heights, lock-nuts 86 with a Washer-sealer 105 could be used on top of the trunk-lid 100 or, for improved looks, a Custom sleeve #1 103 could be used on the two back legs and a Custom sleeve #2 104 used on the front leg. These sleeves 103 and 104 can be of any weather proof material with appropriate internal diameter (slightly larger than the Legs #2 87) and a wall thickness of about 1/8" or more. The Washer-sealer 105 is made of rubber, soft enough to form tightly about both surfaces but strong enough to tolerate moderate pressure and is used for permanent installation with or without sleeves.

Operation of Permanent Installation

FIG. 11B Modification of Preferred Embodiment

This permanent installation would virtually eliminate any concern about theft and provide for continuous use of Rear-View Safety Mirrors without any further operations being required.

Description of Collapsible Configuration

FIG. 13

FIG. 13 shows a collapsible configuration of the preferred embodiment of Rear-View Safety Mirrors. This rear view shows the preferred embodiment with the Frame-backing 30 and back Hinge pins 73 removed. The two completely assembled, identical sides each include the Main-frame assembly 20, the Mirror assembly 60, the Leg assemblies 80 and the foot assemblies 90. The two Main-frame assemblies remain attached by the Hinge assembly 70. The only parts change from the preferred embodiment is the addition of an Angle-set chain 31.

Operation of Collapsible Configuration

FIG. 13

In this configuration the two mirrored sides can be folded together for convenient storage, in a trunk or elsewhere such as for shipping. When using the Rear-View Safety Mirrors on an as-needed basis, the Angle-set chain 31 can remain attached thus providing a stop point when spreading the mirrors. The chain hook at one end can be set to any rung so that the original mirror angle or some other angle of choice can be selected. If height and leveling adjustments were made with the Frame-backing 30 in place, the leg settings are still valid for this configuration. If not, the same procedures would be followed except that the chain 31 or back-ends of the Main-frames 21 would be used to position the back at the 90 degree position. The Suction devices 101 can still be used to reinforce attachment but the directions of pull on the back legs should be toward the front leg or slightly outward to avoid any closure of the backs since the solid backing is not present.

CONCLUSION, RAMIFICATIONS, AND SCOPE

Thus the reader will see that Rear-View Safety Mirrors will provide drivers with convenient visibility of potentially hazardous areas which otherwise might not be visible. This increased visibility is available to a driver by simply looking at the inside rear-view mirror, which is a natural, familiar act resulting in minimal distraction from the road ahead.

The original problem to be solved was only that of finding a way to see around vehicles which could be blocking the driver's view when backing-out of a straight-in parking space. Use of prototypes has revealed, however, that not only has the original problem been solved but that there are a number of other advantages from using Rear-View Safety Mirrors such as:

the so called Blind Spots, which can make lane changes very hazardous, are easily visible with Rear-View Safety Mirrors without the driver having to turn around;

both right and left directions are visible with minimal eye movement, when, for instance, backing out of a home driveway onto a possibly busy street;

having such visibility available even when normal views are blocked, such as by hanging clothes, if there is a clear view via the inside rear-view mirror to the rear;

being able to see vehicles coming towards you from a backward angle such as occurs when a highway exit ramp and service road come together or when you are in a curved right-turn lane at an intersection, stopped at a Yield sign because of cross traffic and needing to know when it is safe to proceed;

being able to offer this increased visibility and its advantages, especially to drivers with a handicap which limits motion and the ability to turn around for visual checks even when the vehicle is stopped;

having a design which can be easily adjusted to fit almost any make or model of sedan and which can be put into immediate use without any vehicle modification.

Although the description above contains many specificities, these should not be construed as limiting the scope of the invention, but as merely providing illustrations of some of the presently preferred embodiments of this invention. For example, the mirrors can vary in size, shape and radius of curvature to best satisfy a producers specific requirements. The rest of the parts would be sized to be compatible with chosen mirror parameters. The use of a spring assembly for attachment has advantages but an adjustable bolt connector could be used. If vertical rear-window space is limited, to avoid loss of rearward vision, the mirrors could be mounted separately on each side of the trunk.

It seems that if use of Rear-View Safety Mirrors on sedans is successful, there would likely be efforts to make this concept adaptable to other types of vehicles such as vans, SUVs, Suburbans or even pick-up trucks and this could be done in any number of ways.

The ultimate use of Rear-View Safety Mirrors would be as built-in units for new vehicles which could be accomplished in more aesthetically appealing ways than available with portable units. Built-ins also could be considerably more sophisticated with driver controls for mirror positions and angles, thus more versatility. Powered units which fold-in or retract are also possible.

Once improvement in driver confidence as well as in driving safety from having increased visibility provided by Rear-View Safety Mirrors has been firmly established and generally accepted, high-tech approaches will undoubtedly be developed. Such an approach might be to use video cameras and dash-board displays to obtain similar results without unduly diverting the driver's attention from the road ahead. In the interim, the Rear-View Safety Mirrors design contained here-in would provide relatively rapid availability of obvious benefits to drivers of a large number of sedan makes and models already on, or soon to be on, the road.

Thus the scope of the invention should be determined by the appended claims and their legal equivalents, rather than by the examples given.

I claim:

1. A rear-view safety mirror which in combination with a vehicle's inside rear-view mirror, provides a driver of a vehicle with visibility of predetermined areas which otherwise may be unobservable by said driver, comprising:
   (a) a mirror assembly having a mirror of predetermined size and curvature with means for attachment to a main-frame assembly with vertical angle adjustment,
   (b) said main-frame assembly with means for inserting a leg assembly, one at each end,
   (c) said leg assembly with means for attaching a foot assembly which swivels and contains a magnet,
   (d) said main-frame assembly with means for attaching a hinge assembly at each end,
   (e) said hinge assembly which has an easily removable pin,
   (f) said hinge assembly which has means for attachment to each end of a frame-backing,
   (g) said frame-backing which has each end attached to one end of two said main-frame assemblies using said hinge assemblies and
   (h) open ends of two said main-frames with means for attaching the open ends together using said hinge assembly thus forming a triangle,
   whereby potentially dangerous driving situations may be easily seen and accidents avoided thus enhancing vehicle safety.

* * * * *